(12) United States Patent
Peschansky et al.

(10) Patent No.: US 11,029,940 B2
(45) Date of Patent: *Jun. 8, 2021

(54) MAINTAINING CLIENT VERSION AFFINITY DURING A SERVER CLUSTER UPGRADE

(71) Applicant: salesforce.com, inc., San Francisco, CA (US)

(72) Inventors: Olga Peschansky, San Francisco, CA (US); Paul Sydell, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,725

(22) Filed: Apr. 21, 2020

(65) Prior Publication Data

US 2020/0249932 A1 Aug. 6, 2020

Related U.S. Application Data

(63) Continuation of application No. 16/121,473, filed on Sep. 4, 2018, now Pat. No. 10,664,266.

(51) Int. Cl.
*G06F 9/50* (2006.01)
*G06F 9/445* (2018.01)
(Continued)

(52) U.S. Cl.
CPC ............... *G06F 8/65* (2013.01); *H04L 67/02* (2013.01); *H04L 67/32* (2013.01); *H04L 67/34* (2013.01);
(Continued)

(58) Field of Classification Search
CPC . G06F 8/65; G06F 8/71; G06F 9/5077; H04L 67/02; H04L 67/32; H04L 67/34;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Martin Mulazzani et al., Fast and Reliable Browser Identification with JavaScript Engine Fingerprint, 2013, [Retrieved on Mar. 5, 2021]. Retrieved from the internet: <URL: https://citeseerx.ist.psu.edu/viewdoc/download?doi=10.1.1.308.4610&rep=rep1&type=pdf> 10 Pages (1-10) (Year: 2013).*
(Continued)

*Primary Examiner* — Anibal Rivera
(74) *Attorney, Agent, or Firm* — Schwabe Williamson & Wyatt

(57) ABSTRACT

Maintaining client version affinity during a rolling server cluster upgrade includes a server in the server cluster receiving a request from a client and checking the request for a version cookie indicating a software version that the client is running. Responsive to a determination that the server is running the same software version as the client, the server serves the request. Responsive to a determination that the client is running a software version matching a previous software version of the server, the server initiates a software upgrade on the client instead of servicing the request. Responsive to a determination that the server is not running the same software version as the client, the server forwards the request to one of the other servers in the server cluster that is running the same software version as the client.

22 Claims, 7 Drawing Sheets

(51) Int. Cl.
  *G06F 9/44* (2018.01)
  *G06F 8/65* (2018.01)
  *H04L 29/08* (2006.01)
  *H04L 29/06* (2006.01)
  *G06F 8/71* (2018.01)

(52) U.S. Cl.
  CPC ............... *G06F 8/71* (2013.01); *H04L 67/10* (2013.01); *H04L 67/16* (2013.01); *H04L 69/02* (2013.01)

(58) Field of Classification Search
  CPC ..... H04L 67/10; H04L 67/16; H04L 67/2823; H04L 69/02
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,714,926 B1* | 3/2004 | Benson .................. H04L 67/02 |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,155,462 B1* | 12/2006 | Singh ..................... G06F 8/65 717/170 |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,380,003 B1* | 5/2008 | Guo ..................... G06F 16/958 709/226 |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,633 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,370,467 B1* | 2/2013 | Sauer ..................... H04L 69/02 709/221 |
| 8,437,345 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,009,313 B2* | 4/2015 | Rice ..................... G06F 16/219 709/225 |
| 9,203,818 B1* | 12/2015 | Roth ..................... H04L 63/08 |
| 9,565,271 B1* | 2/2017 | Burke ..................... H04L 67/16 |
| 9,858,187 B2 | 1/2018 | Sundaravaradan et al. |
| 9,984,002 B2 | 5/2018 | Sundaravaradan et al. |
| 9,990,400 B2 | 6/2018 | Sundaravaradan et al. |
| 10,013,501 B2 | 7/2018 | Sundaravaradan et al. |
| 10,664,266 B2 | 5/2020 | Peschansky |

(56) References Cited

U.S. PATENT DOCUMENTS

| | | |
|---|---|---|
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0009996 A1* | 1/2006 | Lipscomb ............... G06Q 99/00 709/220 |
| 2008/0249972 A1 | 10/2008 | Dillon |
| 2009/0063415 A1 | 3/2009 | Chatfield et al. |
| 2009/0100096 A1* | 4/2009 | Erlichson ................ H04L 67/02 |
| 2009/0100342 A1 | 4/2009 | Jakobson |
| 2009/0177744 A1 | 7/2009 | Marlow et al. |
| 2010/0082813 A1* | 4/2010 | Li ........................... H04L 67/16 709/226 |
| 2011/0202905 A1* | 8/2011 | Mahajan ................. H04L 67/34 717/140 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0067780 A1* | 3/2014 | Lipscomb .......... G06Q 30/0601 707/695 |
| 2014/0280691 A1* | 9/2014 | Buerner ................. H04L 67/02 709/217 |
| 2014/0282468 A1* | 9/2014 | Millett ...................... G06F 8/71 717/170 |
| 2014/0359537 A1 | 12/2014 | Jackobson et al. |
| 2015/0128121 A1* | 5/2015 | Garcia ..................... G06F 8/65 717/170 |
| 2015/0281400 A1* | 10/2015 | Harter ................ H04L 67/2823 709/203 |
| 2018/0041590 A1* | 2/2018 | Ma ........................ G06F 40/197 |
| 2019/0095254 A1* | 3/2019 | Rao ..................... G06F 9/45558 |
| 2020/0073650 A1 | 3/2020 | Peschansky |

OTHER PUBLICATIONS

Aleecia M. McDonald et al., Cookie Confusion: Do Browser Interfaces Undermine Understanding?, Apr. 12-13, 2010, [Retrieved on Feb. 5, 2020]. Retrieved from the internet: <URL: https://dl.acm.org/doi/pdf/10.1145/1753846.1754159?download=true> 6 Pages ( 4393-4398) (Year: 2010).

Atul Adya et al., Thialfi: A Client Notification Service for Internet-Scale Applications, Oct. 23-26, 2011, [Retrieved on Feb. 5, 2020]. Retrieved from the internet: <URL: https://dl.acm.org/doi/pdf/10.1145/2043556.2043570?download=true> 14 Pages (129-142) (Year: 2011).

* cited by examiner

Server Version & Status Repository 212

| ID | Last Update Timestamp | Previous S/W Ver. | Current S/W Ver. | Server Status |
|---|---|---|---|---|
| Server 1 | 07/20/2018: 11:05:00 | 98.10.6 | 98.10.7 | Available/Alive |
| Server 2 | 07/20/2018: 11:05:10 | 98.10.6 | 98.10.7 | Startup |
| | | | | Shutting Down |
| | | | | Busy |
| Server N | 07/20/2018: 11:05:10 | 98.10.5 | 98.10.6 | Offline |

MAINTAINING CLIENT VERSION AFFINITY DURING A SERVER CLUSTER UPGRADE

RELATED APPLICATIONS

The present application is a continuation of U.S. application Ser. No. 16/121,473 filed on Sep. 4, 2018, now issued U.S. Pat. No. 10,664,266, issued May 26, 2020, the contents of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to maintaining client version affinity during a server cluster upgrade.

BACKGROUND

Version management refers to formal processes for making information technology (IT) changes, such as installations, upgrades, patching and migrations of a server cluster, in conjunction with corresponding updates to dependent thick clients (i.e., a client that incorporates proprietary software to communicate with an application executed by a server), while reducing negative impacts to service levels. Two examples of configuration management processes are sticky sessions and Blue-Green deployment.

Sticky sessions are used with load balancing during an upgrade of the server cluster to achieve server affinity where a router or load balancer with sticky sessions support assigns a single server to a particular client/user based on their HTTP session or IP address. While this solution eliminates constant client re-download and hanging requests, it has drawbacks. Sticky sessions tie a client to a specific server which leads to uneven load distribution in the cluster, thus defeating the purpose of any load balancer to equally distribute client load. Another drawback is defining the rules for sticky sessions—the rules must enumerate all possible uniform resource identifiers (URIs) that need to be made sticky, which is a maintenance problem URIs change and the new ones are added in the course of application development.

Blue-Green deployment is a change management technique for releasing software code that reduces downtime and risk by running two identical server production environments called Blue and Green. At any time, only one of the environments is live, with the live environment serving all production traffic, while new code is released in the inactive environment. Blue-green deployments need two identical sets of hardware, and that hardware carries added costs and overhead without actually adding capacity or improving utilization.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 4 is a diagram illustrating an example schema for the server version and status repository.

DETAILED DESCRIPTION

Figure 1A:
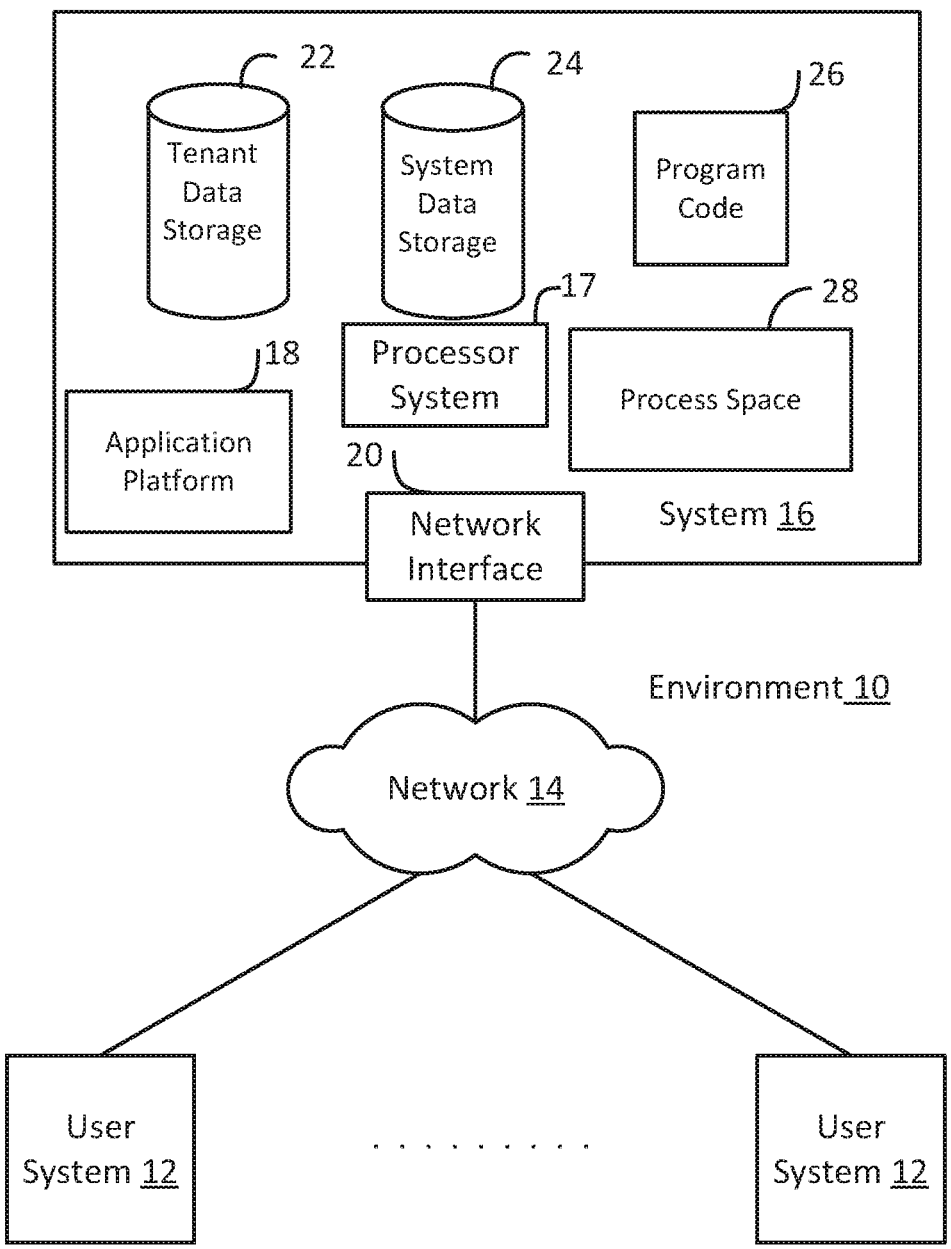
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries/requests.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise network is Lightning®, provided by salesforce.com, inc. of San Francisco, Calif. One example of an online enterprise social network is Chatter®, provided by salesforce.com. Salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Lightning® and/or Chatter® and more generally to enterprise social networking, those of ordinary skill in the art should understand that the disclosed techniques are neither limited to Lightning® or Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
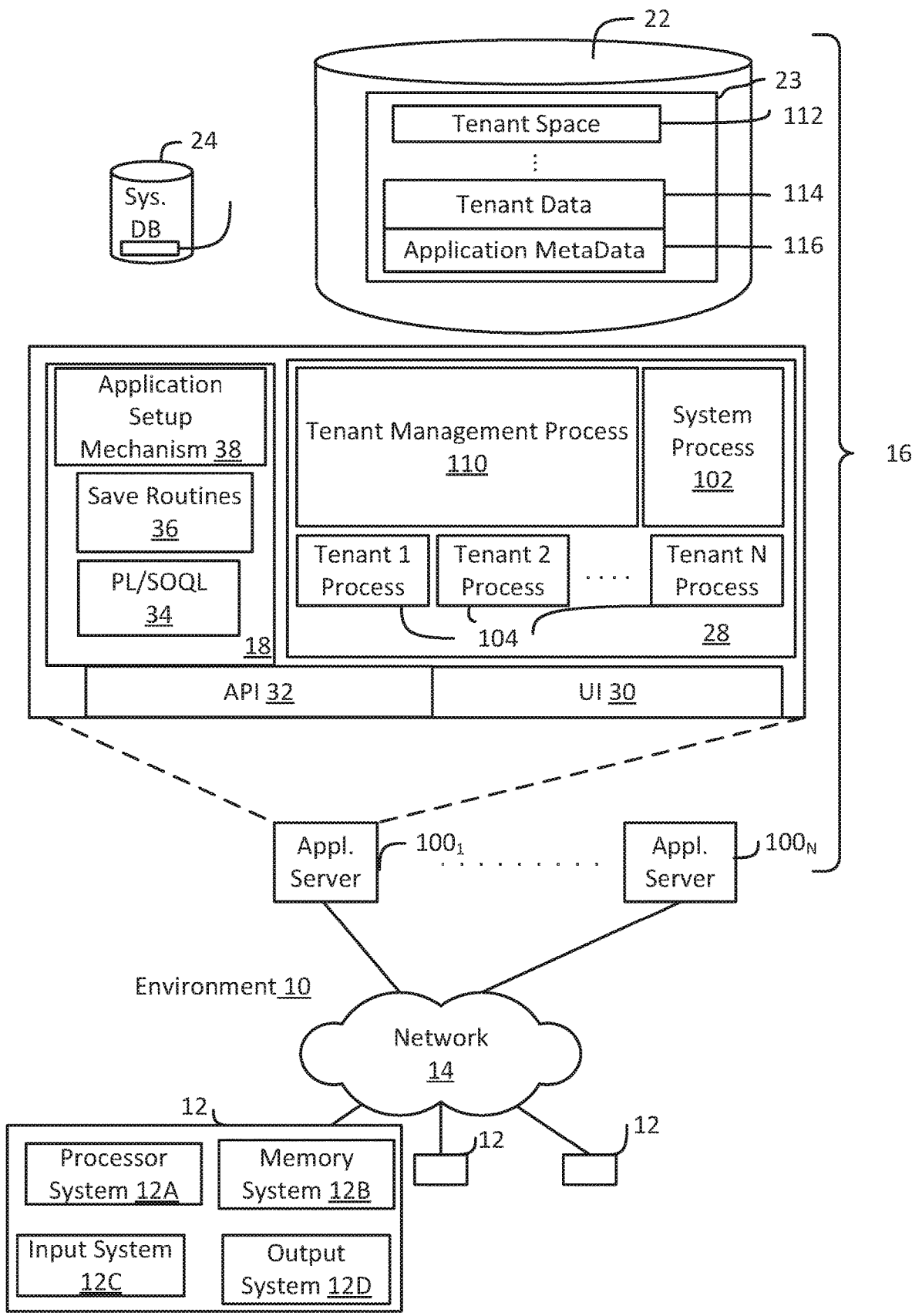
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Maintaining Client Version Affinity During a Server Cluster Upgrade

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

Embodiments describe a system that defines interaction and exchange of information between user systems and the app servers as well as interactions between the app servers in a cloud-based server cluster. As a result of these interactions, a rolling upgrade of the server cluster can be performed such that any thick client/user system sending a request to the server cluster will execute only one software upgrade by downloading a new version of client-side software only once. After the software upgrade, the client is guaranteed to have its requests handled by one of the servers executing the matching new software version without ever having to downgrade. Such a guarantee is called "version affinity" and is achieved without a more limiting "sticky session load balancing" and thus does not have the drawbacks of that solution. It is also achieved entirely within the existing server cluster without reliance on additional servers as is the case with the Blue-Green solution.

Figure 2:
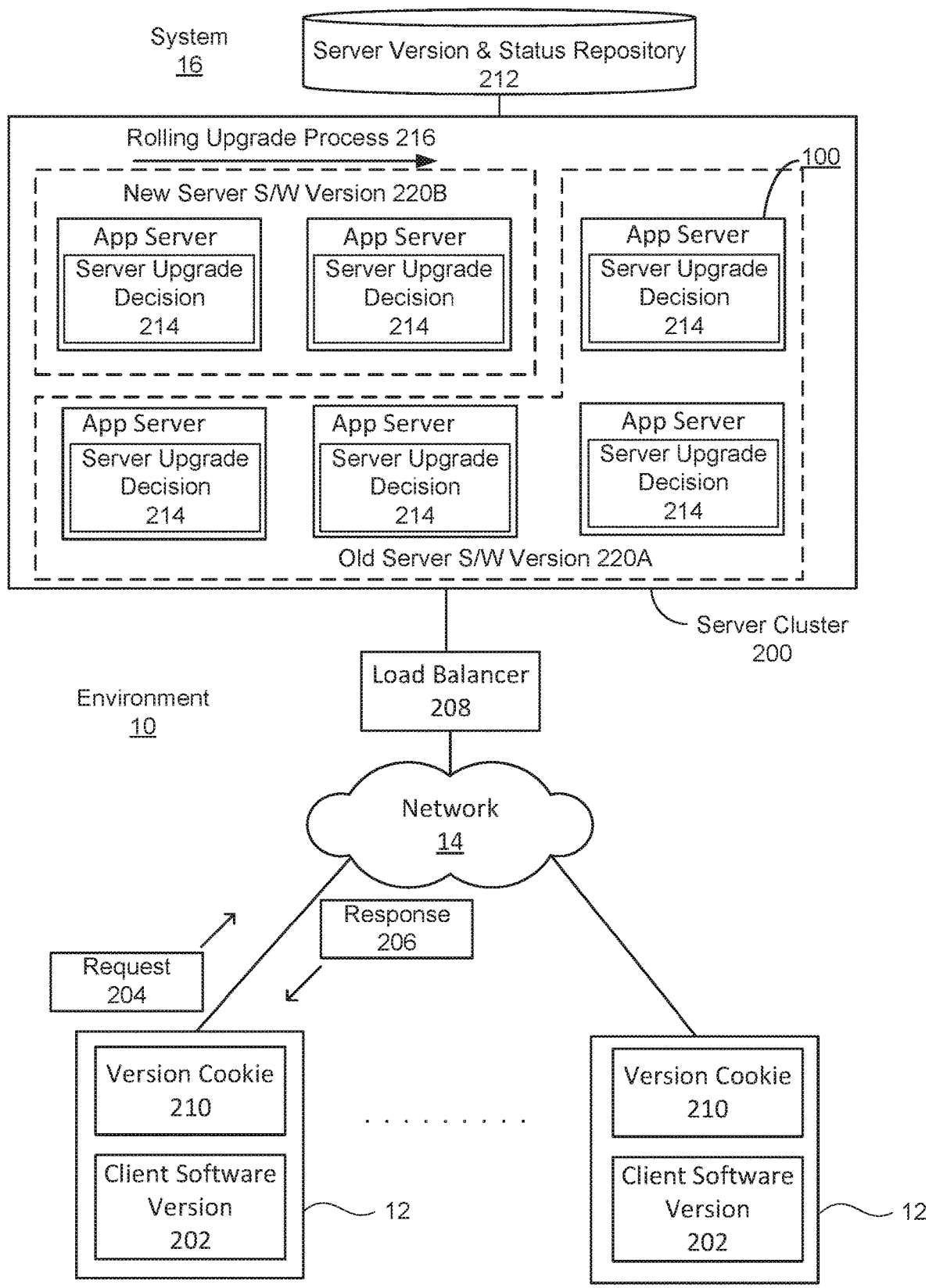
FIG. 2 is a diagram illustrating an example system implementation for maintaining client version affinity during a server cluster upgrade according to one embodiment.

FIG. 2 is a diagram illustrating an example system implementation for maintaining client version affinity during a server cluster upgrade. As described with respect to FIG. 1B, the environment 10 includes user systems 12 in communication through the network 14 with app servers 100 of a server cluster (also referred to as a instance) 200. In one example embodiment, the server cluster 200 may include 20-50 app servers 100. Multiple server clusters may be grouped to form super clusters and groups of super clusters may be used to form a data center.

The user systems 12 run a client software version 202, which sends requests 204 for information to the system 16 and receives responses 206 in reply. User systems 12 are also referred to herein as thick client devices, or simply as clients. As used herein a thick client is a client that incorporates proprietary software, i.e., client software version 202, in order to communicate with an application that is executed by one or more of the app servers 100. A load balancer 208 (including a router implementing a load balancer function) is communicably coupled between the app servers 100 and the user systems 12 to distribute the requests 204 to the app servers 100.

In one embodiment, a rolling upgrade process 216 is periodically used to upgrade groups of one or more app servers 100 at a time in the server cluster 200 from an old server software version 220A to a new server software version 220B to minimize or eliminate any interruption to service. The old and new server software versions 220A and 220B, respectively, are collectively referred to herein as a server software version 220.

When client requests 204 are routed to the app servers 100 during a rolling upgrade process 216, both app servers 100 running the old and new server software versions 220A and 220B are live and taking requests. There is a problem with conventional systems in that some of the requests 204 may be bounced back and forth between servers running the two different server software versions. This may cause a lot of issues as invalidations of client software versions can occur based on which server software version is being run by the servers. Thus, old and new server software versions in the server cluster can lead to frozen loading and various other issues. For example, many users may experience and report infinite reload errors, while other users may experience multiple reloads during the software release or update, resulting in slow loading and instability of the system.

According to one embodiment, the rolling upgrade process 216 of the server cluster 200 is performed with version affinity such that any client sending a request 204 to the server cluster 200 will execute only one software upgrade by downloading a new version of client software 202 only once. After the software upgrade, version affinity guarantees that the client will have future requests 204 handled by one of the app servers 100 executing the new server S/W version 220B matching the current client software version 202 without being "ping-ponged" between server software versions and never having to downgrade.

Figure 3:
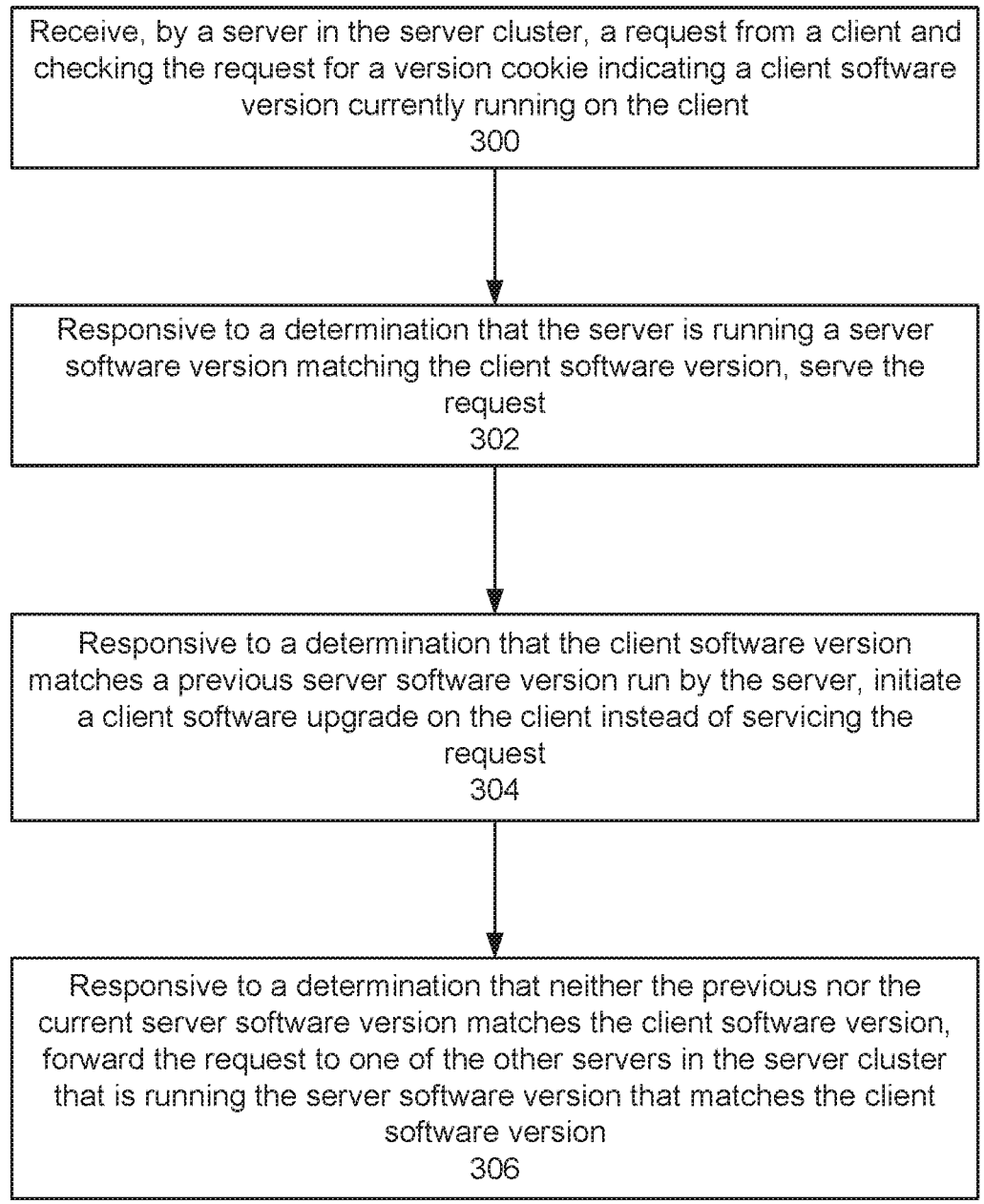
FIG. 3 is a flow diagram illustrating a process by the system for maintaining client version affinity during a server cluster upgrade in accordance with one embodiment.

FIG. 3 is a flow diagram illustrating a process by the system 16 for maintaining client version affinity during a server cluster upgrade in accordance with one embodiment. The process may include receiving by an app server 100 in the server cluster 200, a request 204 from a client and checking the request 204 for a version cookie 210 indicating a client software (S/W) version 202 currently running on the client (block 300).

Responsive to determination that the app server 100 is running a server software version 220 matching the client software version 202, the request 204 is served (block 302). This is the most common outcome, and occurs when there is no ongoing software upgrade in the server cluster 200. This happens when a) the request 204 does not contain a version cookie 210, e.g., because the client is new, or b) the client software version 202 indicated by the version cookie 210 is the same as the server software version 202 run by the app server 100.

Responsive to determination that the client software version 202 matches a previous server software version 220A" run by the app server 100, a client software upgrade is initiated on the client instead of servicing the request (block 304). Responsive to determination that neither a previous nor a current server software version 220 matches the client software version 202, the request 204 is forwarded to one of the other servers 100 (i.e., a peer server) the server cluster 200 that is running the server software version 220 matching the client software version 202 (block 306). In one embodiment, the client software version information is forwarded along with the request 204 to the peer server.

In one embodiment, blocks 302, 304, and 306 are performed by the app server 100 that received the request. However, in other embodiments, blocks 302, 304 and 306 may be performed by another server or component, such as a "software load balancer".

Referring again to FIG. 2, according to one aspect of the present embodiments, the version affinity of the upgrade of the server cluster 200 is accomplished through the use of a combination of i) the version cookie 210 on the user systems 12; ii) a server version and status repository 212 accessible by the app servers 100; and iii) a server upgrade decision component 214 that is executed by the app servers 100 (instead of being a standalone module), as described further below.

The version cookie 210 on the respective user systems 12 indicates the client software version 202 currently being executed. The version cookie 210 is examined by app servers 100 when received in a request 204 sent from a respective user system 12. In one embodiment, the version cookie 210 is set on respective user systems 12 by the server upgrade decision component 214 running on the app servers 100 as part of servicing every client request by including a cookie in a response indicating the current software version of the server. When a new request 204 is subsequently sent to the server cluster 200, a client browser echoes back the version cookie 210 as any other cookie.

In one embodiment, the server upgrade decision component 214 sets the version cookie 210 to its own version name if the request will be processed locally, and if the server upgrade decision component 214 decides to forward the request, the version cookie 210 is set to its own version name by the server that is the recipient of the forwarded request. In one embodiment, the version cookie 210 does not expire (i.e., the expires date is in a distant future), should be secure and apply to all URI paths pointing to the application, which means that multiple version cookies 210 may be set, each for a different set of paths. A secure cookie ensures that it cannot be exploited for a DOS attack. The following are example HTTP responses for setting the version cookies 210:

Header: Set-Cookie: Version='98.10.6; Expires=Sat, 31 Dec. 2022 23:59:59 GMT; Path=/myapp/; Secure
Header: Set-Cookie: Version='98.10.7'; Expires=Sat, 31 Dec. 2022 23:59:59 GMT; Path=/*; Secure The server version and status repository 212 is accessible by all app servers 100 in the server cluster 200 and contains up-to-date information regarding the current and previous server software versions 220 of all app servers 100 as well as the server's current availability status. In some embodiments, the server version and status repository 212 may be implemented as a database table (e.g., system database 24) or an in-memory table in a cluster level cache.

In one aspect of the disclosed embodiments, the server upgrade decision component 214 executed by the servers 100 performs the determination processing of blocks 302, 304 and 306 of FIG. 3. In particular, the server upgrade decision component 214 may be configured to analyze a request 204 received from one of the user systems 12, and use the version cookie 210 to determine that the server software version 220 run by the app server 100 does not match the client software version 202. The server upgrade decision component 214 may then forward the request 204 to another app server 100 in the server cluster 200 that runs a server software version 220 matching the client software version 202. When a response 206 from the other server 100 is received by the first server 100, the server returns the response 206 to the requesting user system 12 as part of a regular request forwarding procedure.

This forwarding procedure is not required and does not occur when all servers 100 in the server cluster 200 are running the same server software version 220. It does, however, happen as soon as the server cluster 200 starts to have two server software versions 220A and 220B running simultaneously, which is the case during the rolling upgrade process 216. The forwarding starts and stops as needed based only on the status of servers 100 in the server cluster 200, as indicated in the server version and status repository 212, and does not require any external signals or additional servers, as would be the case with an upgrade process such as Blue-Green deployment.

In a further aspect of the disclosed embodiments, the server upgrade decision component 214 is also capable of handling a rollback of a software upgrade. Referring to FIG. 2, a rollback may be performed when it is determined that recently deployed new server software version 220B has a severe problem such that the upgraded servers 100 in the server cluster 200 must be returned to the old server software version 220A. A rollback may be full or partial. The difference between the full and partial rollback is based on the moment when the revert of the upgrade is made. If only some servers 100 have been upgraded to the new server software version 220B and the rest are still running the old server software version 220A, then the rollback is applied only to those few upgraded servers and is called a partial rollback. If all servers 100 are already running the new server software version 220B, then a full rollback is performed. In that case, the procedure is indistinguishable from a normal upgrade, only during the full rollback the "upgrade" goes in the opposite direction from the new server software version 220B to the old server software 220A.

After a partial rollback there are two categories of user systems 12 (clients)—those clients that have not yet upgraded their software version 202 to the new version and those that were already upgraded to the new version. The former category of clients need not perform any changes because after the partial rollback all servers 100 will be executing the old software version 220A which matches their software version. The latter category of clients would need to perform a downgrade to return to the old software version 220A. The server upgrade decision component 214 does not need to be informed about the rollback nor does it need to change its behavior. By continuing to execute the same steps as during a normal upgrade it naturally causes the clients in the latter category to downgrade.

As a result of the partial rollback, some servers 100 which have been upgraded to the new software version 220B will be restarted and will be now running the old software version 220A. As part of startup these servers will update their current and previous versions in the repository (block 508), after the rollback the current version for these servers will be the old version 220A and the previous version will be 220B. Thus, a request 204 from an upgraded client would match the server's previous version, and the client would be sent a Client Out Of Sync Exception (COOSE) to initiate a download of software version 220A (block 522). As a result, a client in the latter category of the upgraded clients will perform a downgrade in accordance with the cluster rollback.

In one embodiment, the system 16 may comprise a user interface (UI) framework for developing dynamic web apps for mobile and desktop devices (user systems 12) in which the present embodiments are implemented. In an example embodiment, the UI framework may implement the client software version 202 using JavaScript on the client side and implement the server software version 220 using Apex on the server side.

FIG. 4 is a diagram illustrating an example schema for the server version and status repository 212 and example values therein. In one embodiment, the server version and status repository 212 (hereinafter referred to as repository 212) is a storage data structure that is accessible for read and write from all servers 100 in the server cluster 200. For example, the repository 212 may be implemented as a table in database of the server cluster 200 or a map in a clustered cache.

In one embodiment, the repository 212 may include a plurality of rows and columns where the rows store an entry for each app server 100. In one embodiment, the columns, and therefore each entry, of the repository 212 may include: a server ID 400, a last update timestamp 402, a previous server software version 404, a current server software version 404 and a server status 406.

Values for the server ID 400 may include any alphanumeric identifier for each of the servers 100, e.g., "Server 1" to "Server N," The last update timestamp 402 may include date and time values of the last software update, Jul. 20, 2018: 11:05:00. Values for the previous (old) software version 404 may include any alphanumeric identifier of the last update. e.g., "98.10.6". Values for the current (new) software version may include any alphanumeric identifier of the current software version, e.g., "98.10.7." Values for the server status 408 may include any alphanumeric description of the server availability status. The availability status may have any combination of possible values such as: "Available," "Alive," or "Online;" "Starting" or "Startup;" "Busy;" "Shutting Down;" and "Offline." The servers 100 are capable of fulfilling requests only in Available/Alive status.

The servers 100 update their availability status and timestamp of the last update in the repository 212 when their availability status changes. The servers 100 query or inquire about server software versions 220 and the server status of peers in the server cluster 200 when required by the server upgrade decision component 214.

The server upgrade decision component 214 takes advantage of knowing both the previous and current server software version 220 for each server to implement the directional forwarding in accordance with an aspect of the disclosed embodiments. For example, knowledge of the two different server software versions 220 shows the direction of an upgrade from a previous or old server software version 220A to the current or new server software version 220B. The server upgrade decision component 214 uses this knowledge to gradually steer clients/user systems 12 to the new software version and to avoid bouncing a client between servers 100 running different server software versions 220, which may cause multiple client software version 202 downloads. This directional forwarding is shown in FIG. 5.

Figure 5:
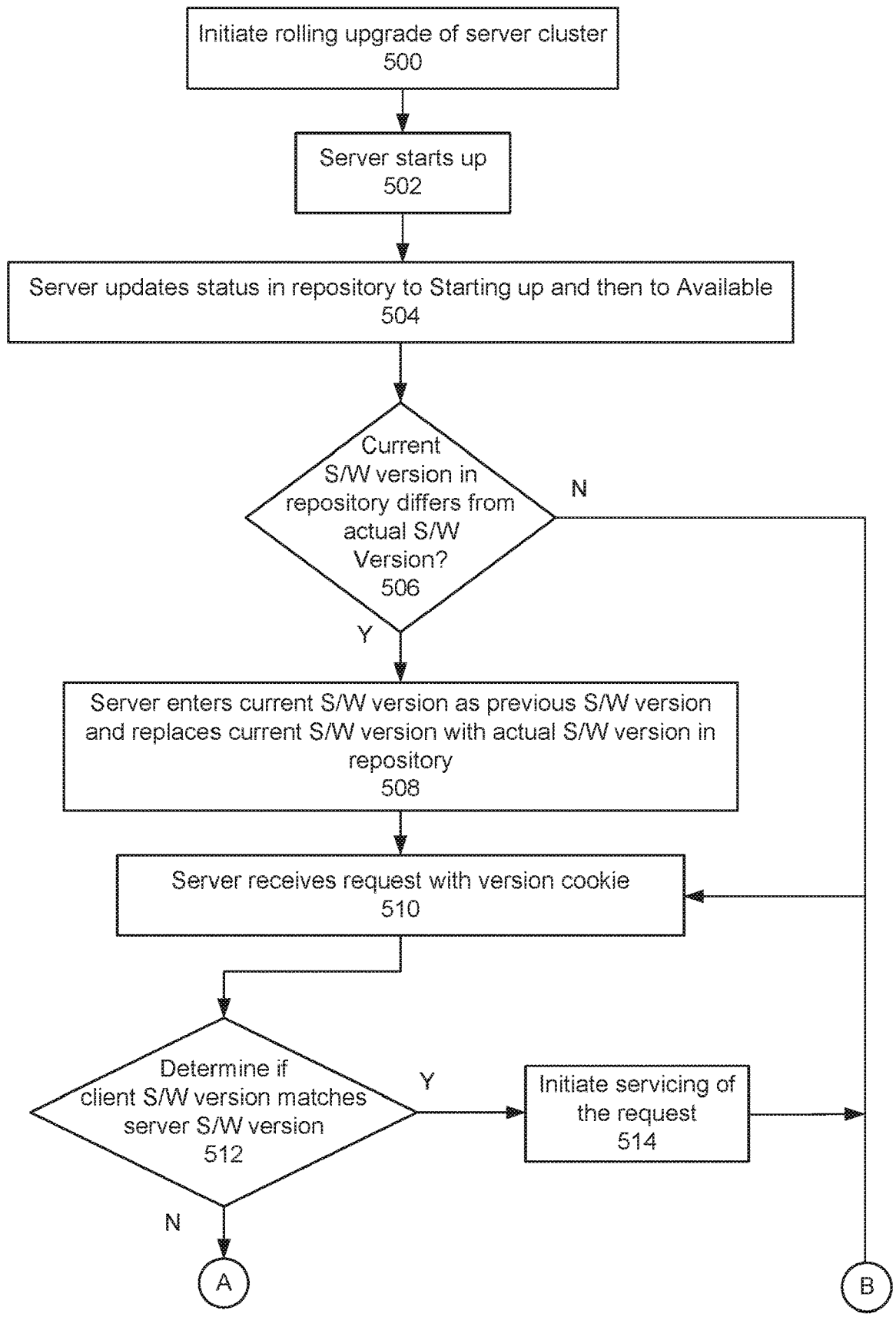
FIG. 5 is a flow diagram illustrating further detail for the process of maintaining client version affinity during a server cluster upgrade in accordance with one embodiment.
Figure 5:
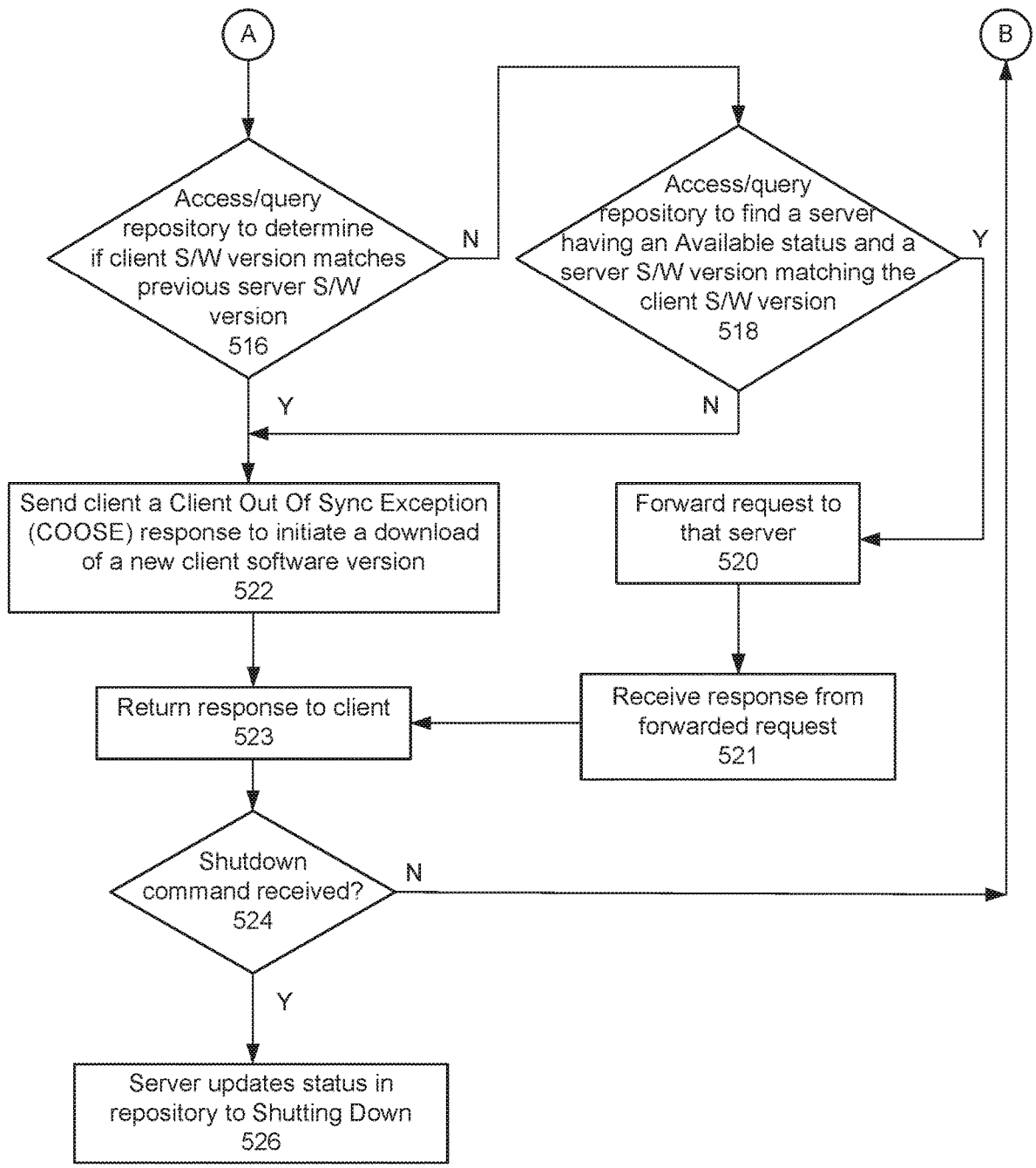

FIG. 5 is a flow diagram illustrating further detail for the process of maintaining client version affinity during a server cluster upgrade in accordance with one embodiment. In one embodiment, the process is performed by the server upgrade decision component 214 with the exception of blocks 500 and 502. The process may begin with the initiation of the rolling upgrade process of the server cluster 200 (block 500). When the server starts up (block 502), the server updates its' server status 408 in the repository 212 first to "Starting up," and then to "Available" once the server is completely started and ready to fulfill requests 204 (block 504).

The server determines if a software upgrade has been performed by accessing the repository 212 to see if the value of the current server software version 406 in the repository 212 differs from the server's actual server software version (block 506). If so, the server has been upgraded, and the server enters the current server software version from the repository 212 as the previous server software version 404, and replaces the current server software version in the repository 212 with its actual server software version (block 508). In one embodiment, server startup is the only time when server software versions in the repository entries may be updated. If the app server 100 has been restarted without an upgrade, the versions would match and no update would occur.

Whether or not a server software upgrade has been performed, the process continues with the server receiving a request 204 from a client/user system 12 along with version cookie 210 (block 510). In one embodiment, the request 204 is forwarded to the server from the load balancer 208.

The server then determines if the client software version 202, as indicated in the version cookie 210, matches the server software version 220 (block 512). In one embodiment, the server may accesses the repository 212 to determine if the client software version 202 matches the current server software version 406 in the repository 212. In another embodiment, the server may access its actual server software version internally without accessing repository 212 to make this determination.

If the client software version 202 does match the server software version 220, the servicing of the request by the server is initiated (block 514), and the process resumes with the server receiving a request 204 (block 510).

When the server receives a request from a client whose version differs from its own (block 512), the server needs to make a decision between forcing the client to update the client software version 202 or forwarding the request to another server having a matching server software version 220.

The server accesses repository 212 to determine if the client software version matches the previous server software version (block 516), and if so, sends client a Client Out Of Sync Exception (COOSE) response to initiate a download of a new client software version (block 522). Only if the client software version 202 does not match the previous server software version the server tries to find another server having a server software version 220 which matches client software version 202.

The server uses repository 212 to find out if such matching peer servers exist and are in an Available state. In particular, the server accesses/queries the repository 212 to determine if the client software version 202 matches the previous server software version 404 in the repository 212 (block 516), and if not, the server accesses/queries the repository 212 to find a peer server having a status of "Available" or "Alive" and a current server software version 406 matching the client software version 202 (block 518).

As an example, the server may execute a query to the repository 212 that reads "find Available servers that are running server software version V", where V is the value of the client software version 202 from the client's version cookie 210. The repository 212 then returns a set of server IDs 400 of any servers found and a null value if none are found. If a list of servers is returned, the server forwards the request to one of the listed servers (block 520). In one embodiment, the servers on the list may be selected for forwarding in a round robin fashion. Once the request is forwarded, the response from the selected server is received (block 521) and then returned to the requesting client (block 523). If no Available server having a current server software version 406 matching the client software version 202 is found (block 518), the process initiates a download of a new client software version (block 522).

The servers 100 may be processing hundreds of requests 204 at a time and many of them would require an answer to the query of block 518. Repeating the same query unlimited number of times would overwhelm the resources. To prevent this the upgrade decision component 214 may use a well-known mechanism called a rate limiter. In one embodiment, there is a separate rate limiter for each value V in the query. The limit is set for N number of queries per second and the most recent result of each query may be cached on the server. When the rate limiter allows a query to the repository 212, the query is executed and a fresh result is cached. When the rate limiter does not allow the query to the repository 212 to run, the server uses the cached result. The value of N (rate per second) may be tuned to achieve a balance between freshness of data and the resource costs of queries. For example, N may be set to 1 per second. Based on the above, it can be assumed that the server always has an answer to the query "find Available servers which are running version V", where the result may be returned either directly from the repository 212 or from the cached result.

During this process, the server has decided not to serve the request and instead forward the request to another peer server in the cluster. This happens when a) request 204 contains the version cookie 210, and b) the client software version 202 and current server software version 406 differ, and c) the client software version 202 does NOT match the server's previous server software version 404, and d) the repository query finds a peer server with an "Available/Alive" server status running a current server software version 406 matching the client software version 202. This logic steers upgraded clients towards servers running the new server software version 220B, instead of bouncing clients between "old" servers and "new" servers.

If the client software version 202 does match the previous server software version 404 in the repository 212 (block 516), then the server sends the client/user system 12 a Client-Out-Of-Sync-Exception (COOSE) response to initiate a download of a new client software version (block 522). In one embodiment, the COOSE response includes the new client software version 202, e.g. by including a link to a site where the user of the user system 12 can invoke the download. In an alternative embodiment, the COOSE response may include a client software setup executable that the user may execute.

This case addresses requests sent by clients running an old client software version when they are dispatched to an upgraded server and the server initiates the client's upgrade. Alternatively, if a client has already experienced a COOS during a current release and after that is dispatched to a server with the old version, the client's request would be forwarded to a server with the new version in blocks 518 and 520. In all other cases the request is served locally and may result in a desired COOS (block 522). In particular, when a server receives request with this server's previous version, the server "knows" that this version is old and instead of forwarding initiates client upgrade via COOS. This scenario is the reason for maintaining the previous software version 404 and the current software version 406 pair in the repository 212.

The server upgrade decision component 214 in conjunction with the repository 212 guarantees one and only one COOSE response per client per software upgrade. The COOSE response is sent when all of the following conditions are true: a) the request 204 contains the version cookie 210, and b) the client software version 202 and current server software version 406 differ, and c) the client software version 202 matches the server's previous server software version 404.

The server may periodically determine if a shutdown command has been received (block 524). If not, the server continues to receive requests 204 (block 510). If a shutdown command has been received, then the server updates its' server status 408 in the repository 212 to "Shutting Down," and then to "Offline" just prior to completion of the shutdown process (block 526).

Example Client—Server Scenarios

Scenarios below show possible outcomes of the logic of the server upgrade decision component 214. The examples assume that the server cluster is being upgraded from server software version 'V2' to software version 'V3'. All app servers are running V2 when the upgrade to software version V3 starts. For the purposes of each example, an app server can belong to one of two groups, G1 or G2, according to the software version the server is currently running. A server is in G1 if it has been upgraded and is running the new software version V3. A server is in G2 if it has not been upgraded yet and is running the old software version V2.

Scenario 1. G1 server has been upgraded (currently on version V3):
The cached values from the status repository 212 for the previous software version 404 is V2 and for the current software version is V3. The handling of the client requests depends on the value of the client version cookie (Cv). For example, a value of Cv0 or Cv1 indicates stale clients that have not connected since an earlier server release (V0 or V1). Based on the value of the client version cookie (Cv) outcomes are as follows:

Cv0—check table for live V0 servers, none will be found, thus return COOSE to client to upgrade to V3.
Cv1—check table for live V1 servers, none will be found, thus return COOSE to client to upgrade to V3.
Cv2—V2 is the old version for this server, thus return COOSE to client to upgrade to V3, consistent with the upgrade from V2 to V3.
Cv3—the versions match, process locally.

Scenario 2. G2 server not yet upgraded (currently on version V2):
The cached values from the repository 212 for the previous software version 404 is V1 and for the current software version is V2. The handling of the client requests depends on the value of the client version cookie (Cv). For example, a value of Cv0 or Cv1 indicates stale clients that have not connected since an earlier release (V0 or V1). Based on the value of the client version cookie (Cv) outcomes are as follows:

Cv0—check table for live V0 servers, none will be found, thus, return COOSE to client to upgrade to V2.
Cv1—V1 is the old version for this server thus, return COOSE to client to upgrade to V2.
Cv2—versions match, process locally.
Cv3—check table for live V3 servers, when such a server is found, forward to a V3 server (it would be a live G1 server).

Scenario 3. A G1 server has been rolled back: this scenario happens if V3 is determined to be not viable after upgrade of G1 servers (G2 servers remain on V2): The value for the previous software version 404 is V3 and for the current software version is V2. The handling of the client requests depends on the value of the client version cookie (Cv). For example, a value of Cv0 or Cv1 indicates stale clients that have not connected since an earlier release (V0 or V1). Based on the value of the client version cookie (Cv) outcomes are as follows:

Cv0—check table for live V0 servers, none will be found return COOSE to client to upgrade to V2.
CV1—check table for live V1 servers, none will be found, return COOSE to client to upgrade to V2.
Cv2—versions match, process locally.
Cv3—V3 is the old version for this server, return COOSE to client to "upgrade" (i.e., rollback) to V2.

Scenario 4. Full rollback after completed upgrade (all servers have been upgraded to V3 and now are being rolled back to V2). This scenario is identical to a normal upgrade. When a server starts up on V2, its values for the previous and current software versions 404 and 406 shift from "V2" and "V3", respectively, to "V3" and "V2". After that the logic of scenario 1 is applied.

Methods and systems for maintaining client version affinity during a server cluster upgrade have been disclosed. Client version affinity is maintained through the use of the server upgrade decision component 214 run by app servers 100 in the server cluster 200; the server version and status repository 212; and the version cookie 210 sent in requests from clients to the server cluster 200. In summary, the server upgrade decision component 214 includes logic to decide whether to proxy (forward) a client request based on its software version and the client software version indicated in the version cookie in the client request. If a decision is made to proxy the request, the server upgrade decision component 214 selects a server from a list of available servers with a software version matching the client's by querying the repository 212 to find a server with the matching software version. In one embodiment, the server upgrade decision component 214 may insert the ID of the selected server into the request and pass the request to a common forwarding mechanism such a the selected server services the client request.

As a result of these interactions, the rolling upgrade of the server cluster can be performed such that clients will execute only one software upgrade by downloading a new client-side software version only once. Thereafter, the clients are guaranteed to have requests handled by one of the servers executing the matching new software version without ever having to downgrade.

What is claimed is:

1. A computer-implemented method for maintaining client version affinity during a server cluster upgrade, the method comprising:
    receiving, by a server in the server cluster, a request from a client and checking the request for a version cookie indicating a client software version currently running on the client;
    responsive to a determination that the server is running a server software version matching the client software version, serving the request;
    responsive to a determination that the server software version does not match the client software version, forwarding the request to one of the other servers in the server cluster that is running the server software version that matches the client software version; and
    responsive to a determination that the client software version matches a previous server software version run by the server, initiating a software upgrade on the client instead of servicing the request, wherein the server sends to the client a Client Out Of Sync Exception (COOSE) response including a new client software version, wherein only one COOSE response is sent to the client during the server cluster upgrade.

2. The computer-implemented method of claim 1, wherein the forwarding the request to one of the other servers in the server cluster that is running the server software version that matches the client software version further comprises:
    responsive to determining that the client software version does not match the previous server software version, querying a repository to find an alive server running the server software version matching the client software version to forward the request to.

3. The computer-implemented method of claim 1, wherein the forwarding the request to one of the other servers further comprises: receiving a response from the one of the other servers and returning the response to the client.

4. The computer-implemented method of claim 1, further comprising: configuring a repository to be accessible by the servers in the server cluster and storing in the repository up-to-date information regarding current and previous server software versions of the server and current availability status of the servers.

5. The computer-implemented method of claim 1, further comprising: implementing the repository as one of a database and a table.

6. The computer-implemented method of claim 1, wherein the determination that the server is running the server software version matching the client software version also includes determining that the request does not contain the version cookie because the client is new.

7. The computer-implemented method of claim 1, further comprising: prior to the server receiving the request from the client, setting the version cookie on the client by the server.

8. The computer-implemented method of claim 1, further comprising: responsive to a determination that new server software version has a severe problem, performing a rollback such that upgraded servers in the server cluster are returned to the previous server software version.

9. A non-transitory computer-readable medium containing program instructions for maintaining client version affinity during a server cluster upgrade, the program instructions for:
    receiving, by a server in the server cluster, a request from a client and checking the request for a version cookie indicating a client software version currently running on the client;
    responsive to a determination that the server is running a server software version matching the client software version, serving the request;
    responsive to a determination that the server software version does not match the client software version, forwarding the request to one of the other servers in the server cluster that is running the server software version that matches the client software version; and
    responsive to a determination that the client software version matches a previous server software version run by the server, initiating a software upgrade on the client instead of servicing the request, wherein initiating a software upgrade on the client further comprises instructions for: the server sending to the client a Client Out Of Sync Exception (COOSE) response including a new client software version, wherein only one COOSE response is sent to the client during the server cluster upgrade.

10. The computer-readable medium of claim 9, wherein the forwarding the request to one of the other servers in the server cluster that is running the server software version that matches the client software version further comprises instructions for:
    responsive to determining that the client software version does not match the previous server software version, querying a repository to find an alive server running the server software version matching the client software version to forward the request to.

11. The computer-readable medium of claim 9, wherein the forwarding the request to one of the other servers further comprises instructions for: receiving a response from the one of the other servers and returning the response to the client.

12. The computer-readable medium of claim 9, further comprising: configuring a repository to be accessible by the servers in the server cluster and storing in the repository up-to-date information regarding current and previous server software versions of the server and current availability status of the servers.

13. The computer-readable medium of claim 9, further comprising: implementing a repository as one of a database and a table.

14. The computer-readable medium of claim 9, wherein the determination that the server is running the server software version matching the client software version also includes determining that the request does not contain the version cookie because the client is new.

15. The computer-readable medium of claim 9, further comprising: prior to the server receiving the request from the client, setting the version cookie on the client by the server.

16. The computer-readable medium of claim 9, further comprising: responsive to a determination that a new server software version has a severe problem, performing a rollback such that upgraded servers in the server cluster are returned to the previous server software version.

17. A system, comprising:
a processing system; and
a memory device coupled to the processing system and including instructions stored thereon that, in response to execution by the processing system, are operable to:
receive, by a server in a server cluster, a request from a client and checking the request for a version cookie indicating a software version that the client is running;
responsive to a determination that the server is running a same software version as the client, serve the request;
responsive to a determination that the server is not running a same software version as the client, forward the request to one of other servers in the server cluster that is running the same software version as the client; and
responsive to a determination that the client is running a software version matching a previous software version of the server, initiate a software upgrade on the client instead of servicing the request, wherein initiating a software upgrade on the client further comprises instructions for: the server sending to the client a Client Out Of Sync Exception (COOSE) response including a new client software version, wherein only one COOSE response is sent to the client during a server cluster upgrade.

18. The system of claim 17, wherein responsive to the determination that the client software version does not match the previous server software version, a repository is queried to find an alive server running the server software version matching the client software version to forward the request to.

19. The system of claim 17, wherein when a response is received from the one of the other servers, the response is returned to the client.

20. The system of claim 17, wherein the repository is configured to be accessible by the servers in the server cluster and stores up-to-date information regarding current and previous server software versions of the server and current availability status of the servers.

21. The system of claim 17, wherein the repository is implemented as one of a database and a table.

22. A computer-implemented method for maintaining client version affinity during a server cluster upgrade, the method comprising:
receiving, by a server in the server cluster, a request from a client and checking the request for a version cookie indicating a client software version currently running on the client;
responsive to a determination that a server software version does not match the client software version, forwarding the request to one of other servers in the server cluster that is running the server software version that matches the client software version; and
responsive to a determination that the client software version matches a previous server software version run by the server, initiating a software upgrade on the client instead of servicing the request, wherein initiating a software upgrade on the client further comprises instructions for: the server sending to the client a Client Out Of Sync Exception (COOSE) response including a new client software version, wherein only one COOSE response is sent to the client during the server cluster upgrade.

* * * * *